United States Patent
Welz

[15] 3,678,670
[45] July 25, 1972

[54] ATTACHMENT FOR RAKES

[72] Inventor: Rudolf Welz, Box 28, Group 515, R.R. #5, Winnipeg, Manitoba, Canada

[22] Filed: June 2, 1971

[21] Appl. No.: 149,184

[52] U.S. Cl. ...................................................56/400.14
[51] Int. Cl. ..............................................................A01d 7/00
[58] Field of Search ..................56/400.01, 400.15; 172/378, 172/379, 380, 387, 388–394

[56] References Cited

UNITED STATES PATENTS

| | | |
|---|---|---|
| 743,981 | 11/1903 | Hagen......................................172/378 X |
| 293,210 | 2/1884 | Dennen et al.......................56/400.15 |
| 2,152,377 | 3/1939 | Friedheim..........................56/400.13 |
| 834,914 | 11/1906 | Kruse et al..........................56/400.14 |
| 2,790,297 | 4/1957 | Gardner............................56/400.14 |
| 210,650 | 12/1878 | Weichart...........................56/400.07 |
| 458,270 | 8/1891 | Dunn................................56/400.07 |

*Primary Examiner*—Russell R. Kinsey
*Attorney*—Kent & Ade

[57] ABSTRACT

An attachment including a shoe is detachably securable to each end of toothed or blade-type rake and is adjustable to control the penetration of the raking element in the soil or grass.

1 Claim, 3 Drawing Figures

Patented July 25, 1972
3,678,670
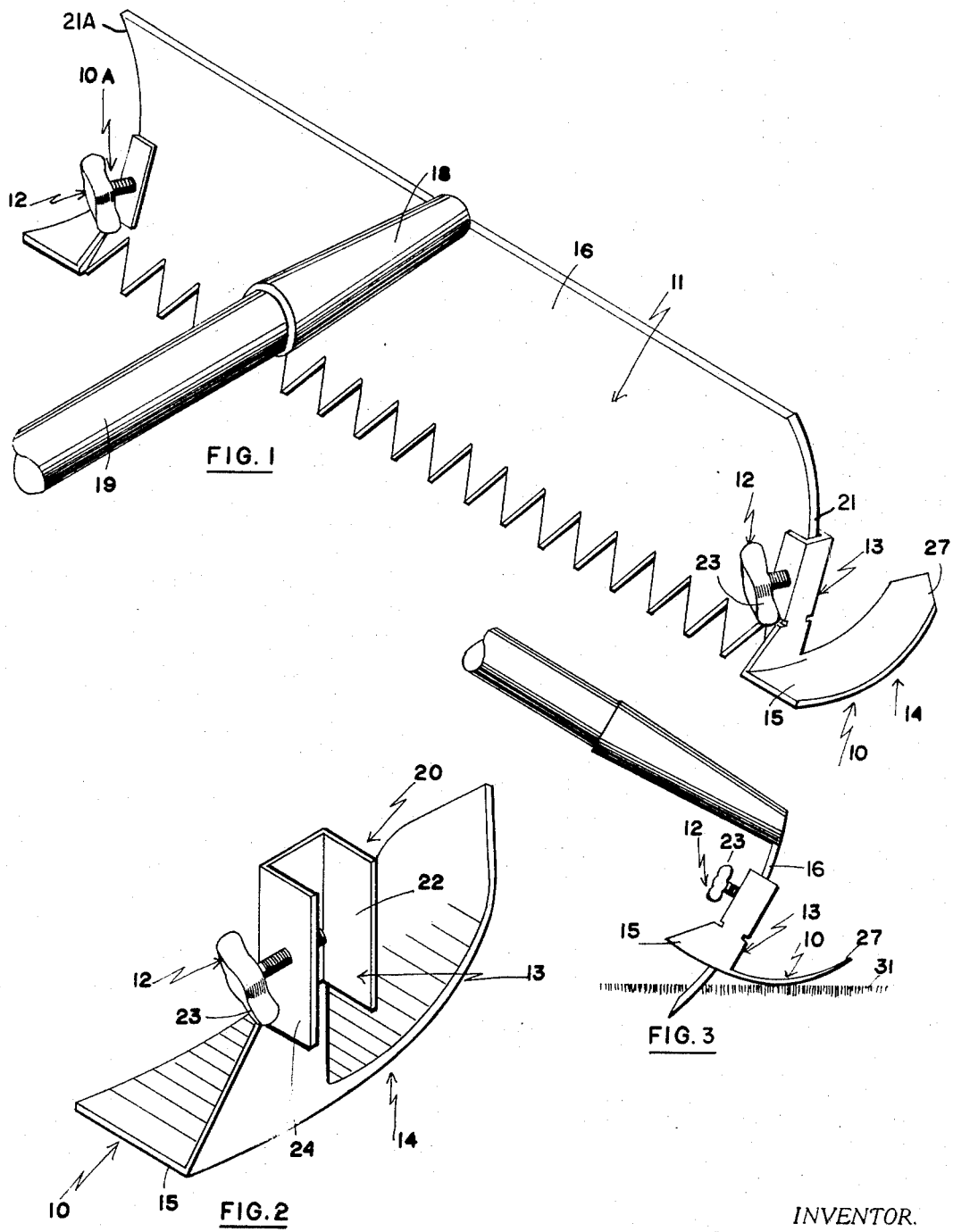
INVENTOR.
RUDOLP WELZ
BY
Kent + Ade

ATTACHMENT FOR RAKES

BACKGROUND OF THE INVENTION

When raking either soil or grass, it is difficult to control the penetration of the teeth or blade of the rake.

Normally this rake tends to dig in far too deeply and it is difficult to control the penetration without considerable effort.

Means have been provided in the past in an attempt to control this depth but these usually are designed specifically for one type of rake and are not interchangeable between makes or types.

SUMMARY OF THE INVENTION

The present invention provides attachments for each side of a rake which are adjustable up and down the sides to control the depth of penetration. They include a clamp member and shoes or wheels which engage the ground or surface being raked and the principal object and essence of the invention is to provide such an attachment which is readily attachable to any type or make of rake whether it be a toothed rake or a blade type rake.

Another object of the invention is to provide a device of the character herewithin described which enables a rake, particularly a rake used on grass to be pushed and pulled back and forth readily and easily without the rake digging in or jamming.

A yet further object of the invention is to provide a device of the character herewithin described which enables a rake to be used interchangeably on garden soil or lawns and, when used on garden soil, enables the rake to be used to lightly rake a seed bed or deeply rake with a harrowing action.

A yet further object of the invention is to provide a device of the character herewithin described which is simple in construction, economical in manufacture, and otherwise well suited to the purpose for which it is designed.

With the considerations and inventive objects herein set forth in view, and such other or further purposes, advantages or novel features as may become apparent from consideration of this disclosure and specification, the present invention consists of the inventive concept which is comprised, embodied, embraced, or included in the method, process, construction, composition, arrangement or combination of parts, or new use of any of the foregoing, herein exemplified in one or more specific embodiments of such concept, reference being had to the accompanying FIGURES in which:

DRAWINGS

FIG. 1 is an isometric view of a blade type rake with my attachments secured thereto.

FIG. 2 is an isometric view of one of the attachments per se.

FIG. 3 is an end view of the rake and attachment shown in FIG. 1.

In the drawings like characters of reference indicate corresponding parts in the different figures.

DETAILED DESCRIPTION

In FIG. 1, a blade type rake 11 is shown which consists of an arcuately curved blade 16 having teeth 17 formed upon the lower edge thereof and a socket 18 secured centrally adjacent the upper edge which receives the conventional rake handle 19 in the usual way.

The attachment 10 consists of a clamp member 13 which comprises a vertically situated length of channel 20 engageable with the side edge 21 of the rake 11 by the open side 22 of the channel as clearly illustrated in FIG. 1. Means to detachably secure the channel take the form of the clamp bolt 12 having wings 23 secured to one end thereof, the screw-threaded bolt portion of clamp bolt 12 screw-threadably engaging an aperture in one side flange 24 of the channel and thus holding the channel firmly in position upon the end of the rake.

An arcuately curved shoe 14 is secured adjacent one end 15 thereof to the lower end of the channel and adjacent the closed side thereof so that the shoe extends beyond the channel as clearly shown in the drawings. The other end 27 of the shoe curves upwardly from the lower end 25 of the channel and forwardly of the rake when attached as shown in FIG. 1. It is of course appreciated that the attachment 10A secured to the other end or edge 21A of the rake is similar in construction but is handed with respect to the attachment 10.

In operation, the attachments are secured to the ends or edges 21 and 21A of the rake and are adjusted so that the teeth 17 extend below the shoes 14 and by adjusting the attachments upon the edges, the depth of penetration is controlled.

FIG. 3 shows the rake in the normal working position with the shoe 14 engaging the surface 31, it being understood that the inclination of the blade 16 causes the arcuately curved shoe to engage the ground intermediate the ends of the shoe as clearly illustrated in FIG. 3.

Various modifications can be made within the scope of the inventive concept which is herein disclosed and/or claimed. Accordingly, it is intended that what is set forth should be regarded as illustrative of such concept and not for the purpose of limiting protection to any particular embodiment thereof, and that only such limitations should be placed upon the scope of protection to which the inventor hereof is entitled as justice dictates.

What I claim as my invention is:

1. The combination of a rake including a transversely elongated raking member with downwardly projecting teeth, and a pair of ground-engaging attachments removably and adjustably mounted on the end edge portions of said raking member to limit penetration of said teeth into the ground, said attachments being similar in construction and each comprising an elongated and longitudinally curved ground-engaging shoe, an upstanding plate provided at one side edge of one end portion of said shoe, a pair of spaced flanges provided at opposite side edges of the upper end portion of said upstanding plate and coacting with said upper end portion to define an open-sided channel which is open on that side of the plate opposite from said shoe, said channel receiving therein an end edge portion of said raking member so that said teeth project below said shoe in a plane intermediate the ends of the shoe, and a clamping bolt extending into said channel through one of said flanges for removably and adjustably clamping the attachment on the raking member.

* * * * *